(12) United States Patent
Jeon et al.

(10) Patent No.: US 6,362,858 B1
(45) Date of Patent: Mar. 26, 2002

(54) METHOD OF MANUFACTURING LIQUID CRYSTAL DISPLAY DEVICE

(75) Inventors: Jong Yob Jeon; Jung Yeal Lee, both of Kyoungki-do (KR)

(73) Assignee: Hyundai Display Technology, Inc., Kyoungki-do (KR)

( * ) Notice: Subject to any disclaimer, the term of this patent is extended or adjusted under 35 U.S.C. 154(b) by 0 days.

(21) Appl. No.: 09/456,188

(22) Filed: Dec. 7, 1999

(30) Foreign Application Priority Data

Dec. 16, 1998 (KR) .............................................. 98-55248

(51) Int. Cl.⁷ .............................................. G02F 1/136
(52) U.S. Cl. .......................................... 349/43; 349/141
(58) Field of Search ...................... 349/43, 141; 438/30

(56) References Cited

U.S. PATENT DOCUMENTS

| | | | | |
|---|---|---|---|---|
| 4,560,994 A | | 12/1985 | Sprague ........................ | 346/108 |
| 5,576,862 A | | 11/1996 | Sugiyama et al. ............. | 359/75 |
| 5,959,708 A | | 9/1999 | Lee et al. ..................... | 349/143 |
| 6,014,190 A | * | 1/2000 | Kim et al. ..................... | 349/39 |
| 6,064,451 A | * | 5/2000 | Oh et al. ...................... | 349/40 |
| 6,191,837 B1 | * | 2/2001 | Fujimaki et al. ............. | 349/141 |
| 6,233,034 B1 | * | 5/2001 | Lee et al. ..................... | 349/141 |

FOREIGN PATENT DOCUMENTS

JP          04316022         11/1992   ......... G02F/1/1343

* cited by examiner

*Primary Examiner*—Kenneth Parker
*Assistant Examiner*—David Chung
(74) *Attorney, Agent, or Firm*—Ladas & Parry

(57) ABSTRACT

Disclosed is a method of manufacturing a fringe field switching mode liquid crystal display device which can simplify process by reducing mask number. According to the present invention, a first transparent metal layer and a first metal layer are sequentially deposited on a transparent insulating substrate and patterned using a first mask. Next, a gate insulating layer, an amorphous silicon layer and a silicon nitride layer are sequentially deposited on the overall substrate and the silicon nitride layer is patterned using a second mask. The pattern portion is then patterned using a third mask so as to be exposed in the shape of a plate. Thereafter, a doped amorphous silicon layer and a second metal layer are sequentially deposited on the overall substrate and the second metal layer is patterned using the fourth mask. The doped amorphous silicon layer and the amorphous silicon layer are then etched using the source and drain as a mask. Next, a passivation layer is formed on the overall substrate and etched so as to expose a portion of the source. Thereafter, a second transparent metal layer is deposited on the passivation layer so as to fill the contact hole and patterned using a sixth mask.

3 Claims, 4 Drawing Sheets

METHOD OF MANUFACTURING LIQUID CRYSTAL DISPLAY DEVICE

BACKGROUND OF THE INVENTION

1. Field of the Invention

The present invention relates to a method of manufacturing a liquid crystal device, and more particularly to a method of manufacturing a FFS(fringe field switching) mode-liquid crystal display device driving with fringe field.

2. Description of the Related Art

A FFS mode-liquid crystal display device is suggested for improving aperture ratio and transmittance as illustrated in U.S. Pat. Ser. No. 09/087,422. In this FFS mode-liquid crystal display device, counter and pixel electrodes are formed of a transparent conductor. Furthermore, the space between the counter and pixel electrodes is narrow, so that a fringe field is formed therebetween in a presence of electric field, thereby driving all liquid crystal molecules existing on the electrodes.

FIG. 1 is a cross sectional view showing the conventional FFS mode-liquid crystal display device.

Referring to FIG. 1, a first ITO(indium tin oxide) layer and a first metal layer having a low resistivity are sequentially formed on a transparent insulating substrate 10 and patterned using a first mask to form a gate bus line 12 and a common signal line(not shown). Preferably, the first metal layer is formed of a MoW layer. The exposed first ITO layer is then patterned using a second mask to form a counter electrode 13 in the shape of comb or oblique plate. Thereafter, a gate insulating layer 14 is formed on the overall substrate and an amorphous silicon layer and a silicon nitride layer are sequentially thereon. The silicon nitride layer is then patterned using a third mask to form an etch stopper 16.

Next, a doped amorphous silicon layer is deposited on the overall substrate. The doped amorphous silicon layer and the amorphous silicon layer are then patterned using a fourth mask to form an ohmic layer 17 and a channel layer 15. As not shown in FIG. 1, the gate insulating layer 14 is then etched using a fifth mask to open pad portions. A second metal layer having a low resistivity is then deposited on the overall substrate and patterned using a sixth mask to form a source and a drain 18a and 18b. Thereafter, a second ITO layer is formed on the overall substrate and patterned using a seventh mask to form a pixel electrode 19 in the shape of comb. A passivation layer 100 is then deposited on the overall substrate and patterned using a eighth mask so as to cover a thin film transistor portion.

However, as described above, eighth masks are required for manufacturing the liquid crystal display device, so that process is complicated and process time is long. As a result, cost is increases and yield decreases.

SUMMARY OF THE INVENTION

It is therefore an object of the present invention to provide a method of manufacturing a fringe field switching mode-liquid crystal display device which can simplify process by reducing mask number, for solving the problems in the conventional art.

To accomplish this above object, according to the present invention, a first transparent metal layer and a first metal layer are sequentially deposited on a transparent insulating substrate and patterned using a first mask, thereby forming a gate bus line and defining a pattern portion having counter electrode and common signal line regions. Next, a gate insulating layer, an amorphous silicon layer and a silicon nitride layer are sequentially deposited on the overall substrate and the silicon nitride layer is patterned using a second mask, thereby forming a etch stopper on the gate bus line. The pattern portion is then patterned using a third mask so as to be exposed in the shape of plate, thereby forming a counter electrode consisting of the first transparent metal layer and a common signal line consisting of the first metal layer and opening pad portions. Thereafter, a doped amorphous silicon layer and a second metal layer are sequentially deposited on the overall substrate and the second metal layer is patterned using a fourth mask, thereby forming a data bus line, a source and a drain. The doped amorphous silicon layer and the amorphous silicon layer are then etched using the source and the drain as a mask to form an ohmic layer and a channel layer. Next, a passivation layer is formed on the overall substrate and etched so as to expose a portion of the source, thereby forming a contact hole. Thereafter, a second transparent metal layer is deposited on the passivation layer so as to fill the contact hole and patterned using a sixth mask, thereby forming a pixel electrode in the shape of comb. Here, the pixel electrode overlaps with the counter electrode and is in contact with the source.

Additional object, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Hereinafter, a preferred embodiment of the present invention will be explained with reference to accompanying drawings.

FIG. 2A to FIG. 2E are plane views describing a method of manufacturing a FFS mode-liquid crystal display device according to an embodiment of the present invention.

Figure 1:
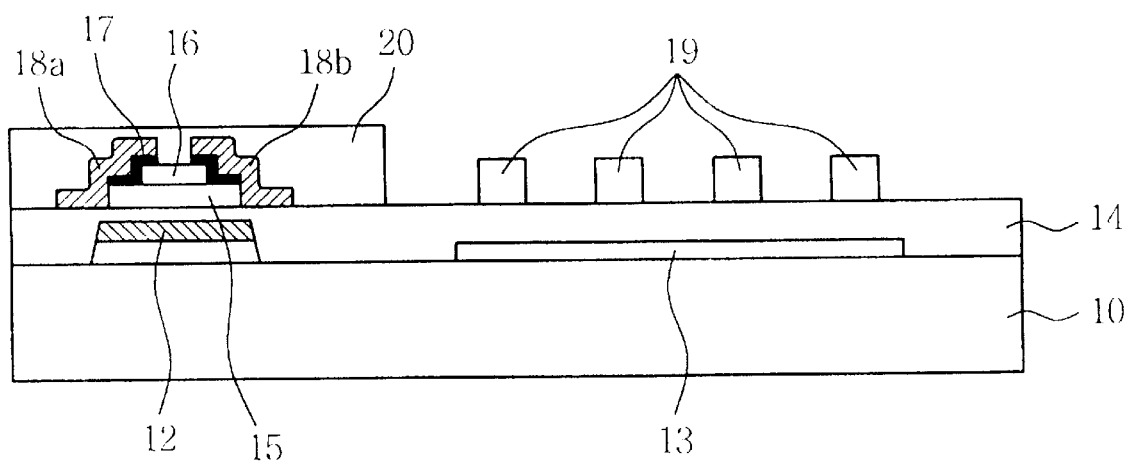
FIG. 1 is a cross sectional view showing the conventional FFS mode-liquid crystal display device.
Figure 2A:
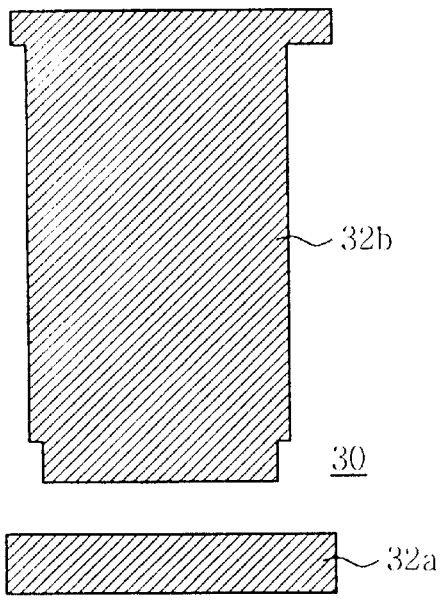
FIG. 2A to FIG. 2E are plane views describing a method of manufacturing a FFS mode-liquid crystal display device according to an embodiment of the present invention.

Referring to FIG. 2A, a first ITO layer and a first metal layer having a low resistivity are formed on a transparent insulating layer 30, sequentially. Preferably, the first ITO layer is formed to the thickness of 400 to 1,000 Å. Furthermore, the first metal layer is formed of Cr layer. The first metal layer and the first ITO layer are then patterned using a first mask to form a gate bus line 32a and defining a pattern portion 32b having counter electrode and common signal line regions.

Figure 2B:
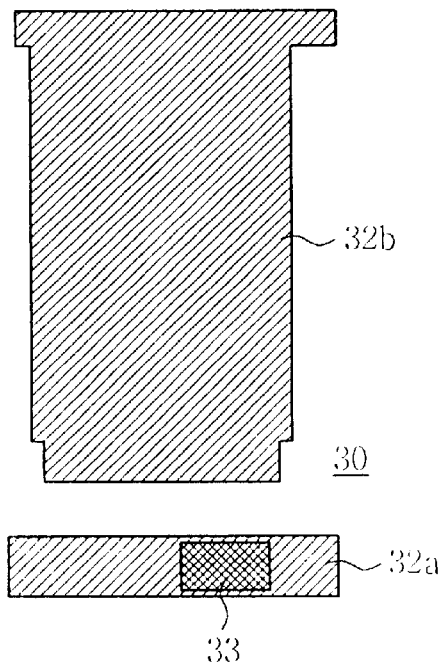

Referring to FIG. 2B, a gate insulating layer(not shown), an amorphous silicon layer(not shown) and a silicon nitride layer are sequentially formed on the overall substrate. The silicon nitride layer is then patterned using a second mask to form an etch stopper 33 on the gate bus line 32a.

Figure 2C:
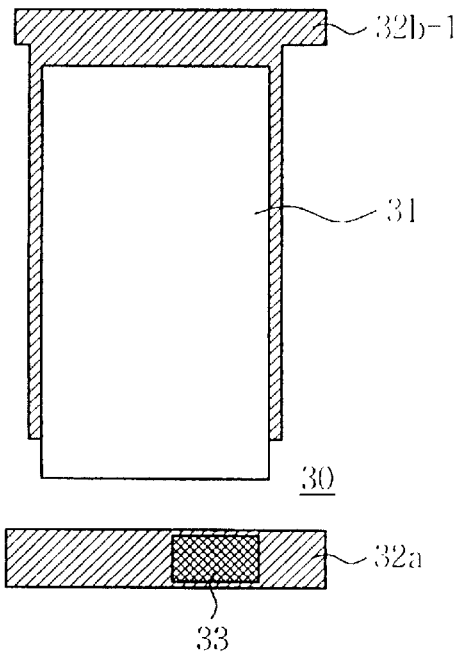

Referring to FIG. 2C, the pattern portion 32b is patterned using a third mask so as to expose the first ITO layer, thereby forming a counter electrode 31 consisting of the first ITO layer and a common signal line 32b-1 and opening pad portions(not shown). Here, the counter electrode 31 is exposed in the shape of plate. Furthermore, the common signal line 32b-1 is formed in the edge of the counter electrode 31 to receive outside signals.

Figure 2D:
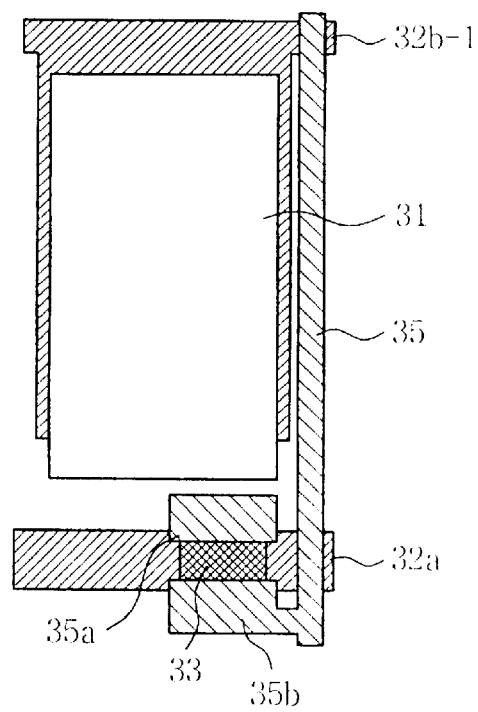

Referring to FIG. 2D, a doped amorphous silicon layer and a second metal layer having a low resistivity are sequentially formed on the overall substrate. The second metal layer is then patterned using a fourth mask to form a data bus line 35, a source and a drain 35a and 35b. Here, the data bus line 35 crosses over the gate bus line 32a. Next, the doped amorphous silicon layer and the amorphous silicon layer are etched using the source and the drain 35a and 35b to form an ohmic layer and a channel layer(not shown), respectively.

Figure 2E:
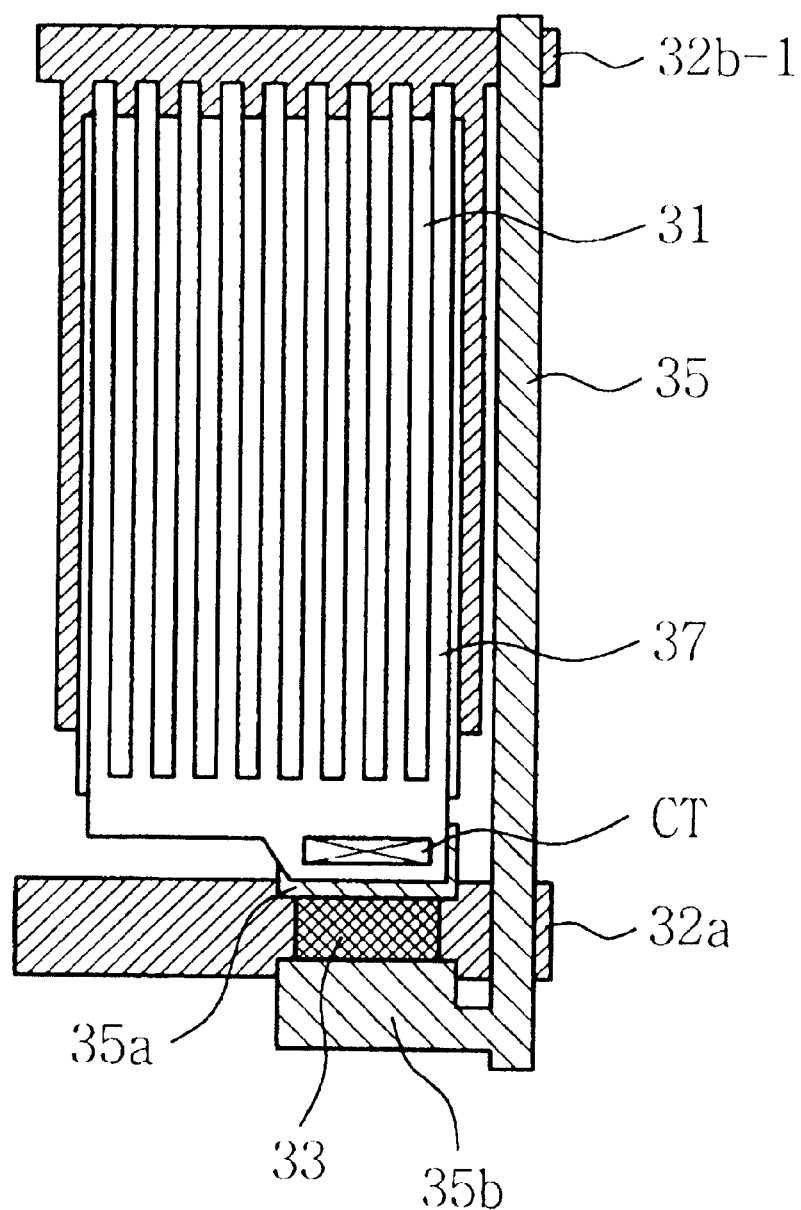

Referring to FIG. 2E, a passivation layer(not shown) is formed on the overall substrate. The passivation layer is then etched using a fifth mask so as to expose a portion of the source 35a, thereby forming a contact hole. Thereafter, a second ITO layer is deposited on the passivation layer so as to fill the contact hole and patterned using a sixth mask, thereby forming a pixel electrode 37 in the shape of comb. Here, the pixel electrode 37 is overlapped with the counter electrode 31 and is in contact (CT) with the source 35a.

According to the present invention, when forming a counter electrode and a common signal line, pad portions are opened. Furthermore, an ohmic layer and a channel layer are formed by a etching using a source and a drain as a mask.

Therefore, mask number decreases compared with the prior art, thereby simplifying process. As a result, cost is decreases and yield is improved.

Although the preferred embodiment of this invention has been disclosed for illustrative purpose, those skilled in the art will appreciate that various modifications, additions and substitutions are possible, without departing from the scope and spirit of the invention as described in the accompanying claims.

What is claimed is:

1. A method of manufacturing a liquid crystal display device driving with fringe field between counter and pixel electrodes, comprising the steps of:

depositing a first transparent metal layer and a first metal layer on a transparent insulating substrate in sequence and patterning the first transparent metal layer and the first metal layer using a first mask, thereby forming a gate bus line and defining a pattern portion having counter electrode and common signal line regions;

depositing a gate insulating layer, an amorphous silicon layer and a silicon nitride layer on the overall substrate sequentially and patterning the silicon nitride layer using a second mask, thereby forming a etch stopper on the gate bus line;

patterning the pattern portion using a third mask so as to be exposed in the shape of plate, thereby forming a counter electrode consisting of the first transparent metal layer and a common signal line consisting of the first metal layer and opening pad portions;

depositing a doped amorphous silicon layer and a second metal layer on the overall substrate sequentially and patterning the second metal layer using a fourth mask, thereby forming a data bus line, a source and a drain;

etching the doped amorphous silicon layer and the amorphous silicon layer using the source and the drain as a mask to form an ohmic layer and a channel layer;

forming a passivation layer on the overall substrate and etching the passivation layer so as to expose a portion of the source, thereby forming a contact hole; and depositing a second transparent metal layer on the passivation layer so as to fill the contact hole and patterning the second transparent metal layer using a sixth mask, thereby forming a pixel electrode in the shape of comb, the pixel electrode overlapping with the counter electrode and being in contact with the source.

2. The method according to claim 1, wherein the first and second transparent metal layers are formed of an ITO layer, respectively.

3. The method according to claim 1, wherein the first metal layer is formed of a Cr layer.

* * * * *